(12) United States Patent
Kiernan et al.

(10) Patent No.: US 6,831,977 B2
(45) Date of Patent: Dec. 14, 2004

(54) COVER FOR A TELEPHONE HANDSET

(75) Inventors: Louise Kiernan, County Clare (IE); Colm Conlon, County Clare (IE); Colm Tobin, Limerick (IE)

(73) Assignee: Molex Incorporated, Lisle, IL (US)

( * ) Notice: Subject to any disclaimer, the term of this patent is extended or adjusted under 35 U.S.C. 154(b) by 450 days.

(21) Appl. No.: 09/791,351

(22) Filed: Feb. 23, 2001

(65) Prior Publication Data

US 2002/0118826 A1 Aug. 29, 2002

(51) Int. Cl.⁷ .................... H04M 1/00; H04M 9/00
(52) U.S. Cl. .................... 379/433.09; 379/433.01; 379/433.08
(58) Field of Search .............. 379/428.01, 428.02, 379/433.08, 433.09, 433.01, 419; 235/486; 455/558, 575.1; 361/729

(56) References Cited

U.S. PATENT DOCUMENTS

| | | | | |
|---|---|---|---|---|
| 5,224,873 A | | 7/1993 | Duffet et al. ............... | 439/326 |
| 5,436,969 A | * | 7/1995 | Kobayashi ............. | 379/433.09 |
| 5,831,256 A | * | 11/1998 | De Larminat et al. ...... | 235/486 |
| 5,883,787 A | | 3/1999 | Reier ......................... | 361/752 |
| 5,949,048 A | * | 9/1999 | Nakamura et al. .......... | 235/439 |
| 6,226,189 B1 | * | 5/2001 | Haffenden et al. .......... | 361/814 |
| 6,325,637 B1 | * | 12/2001 | Barnett ........................ | 439/67 |
| 6,665,544 B1 | * | 12/2003 | Michel et al. .............. | 455/558 |
| 2003/0156388 A1 | * | 8/2003 | Christensen et al. ........ | 361/729 |

FOREIGN PATENT DOCUMENTS

| | | | | |
|---|---|---|---|---|
| DE | 195 43 732 A1 | 11/1995 | ............ | H04M/1/02 |
| DE | 198 39 249 A1 | 8/1998 | ............ | H04M/1/02 |
| EP | 0 409 640 A2 | 7/1990 | ............ | H01R/13/24 |
| EP | 1 026 868 A1 | 8/2000 | ............ | H04M/1/02 |
| EP | 0 522 762 A2 | 6/2002 | ............ | H04M/1/72 |
| GB | 2 326 050 A | 12/1998 | ............ | H04B/1/38 |
| GB | 2328772 | * 3/1999 | ............ | G06K/7/01 |
| WO | WO 98/13784 | 4/1998 | ............ | G05K/7/00 |

* cited by examiner

Primary Examiner—Jack Chiang
Assistant Examiner—M C. Ubiles
(74) Attorney, Agent, or Firm—Stacey E. Caldwell

(57) ABSTRACT

A rear cover (1) for a telephone handset (2) is described. An inner area of the handset (2) is adapted to receive electronic circuitry (27) for the operation of the telephone. A portion of the rear cover is adapted to provide a housing (4) for a SIM card (5). The rear cover (1) is provided with electronic terminals (8b) adapted to enable electronic communication between a SIM card (5) and the electronic circuitry (27) within the telephone. The rear cover (1) desirably additionally provides a housing for a battery.

1 Claim, 4 Drawing Sheets

COVER FOR A TELEPHONE HANDSET

FIELD OF THE INVENTION

The invention relates to telephone handsets and in particular to a cover of a mobile telephone adapted to receive a SIM card.

BACKGROUND OF THE INVENTION

In today's mobile, radio and or wireless telephones, a user subscribes to a particular network operator and is then enabled to roam within the environs defined by that network as an operable area. As long as the user is within coverage of the specific network, telephone and data communication calls can be routed to and made by the user. The network requires an identifier to be associated with each user so as to enable it to route messages to that specific user and also to bill the user for calls made. The identifier associated with each user is typically stored on an integrated circuit card known as a Subscriber Identification Module (SIM) card, which is a removable card, being receivable within the mobile telephone and, once received, adapted to be in electronic communication with the circuitry of the telephone.

It is important that each SIM card can be removed or inserted easily within the SIM card retaining portion of the telephone, but that once inserted is securely retained within the telephone. It is the information on the SIM card that identifies a user, his International Mobile Subscriber Identity (IMSI) and telephone number, and often also the address book of that user. On subscription to a particular network the user is issued with a SIM card which he can then insert and use in particular mobile phone handsets depending on choice. If the user wishes to change his handset, for example to upgrade, he can simply remove the SIM card from the old handset and place it into the new handset, maintaining his number and address book. It will be apparent that the external dimensions of the SIM card are therefore standard within the industry so as to enable compatibility with multiple handsets of varying manufacturers. The SIM card once mounted within the telephone requires a mounting position that enables electronic contact between contacts of the phone circuitry and contacts of the SIM card.

Although the external dimensions of the SIM card have been standardized, the retaining portions within the telephone adapted to receive the SIM card are varied. For example International Application WO 98/13784 of the Whitaker Corporation describes an electrical connector having an initial insertion slot at a first end adapted to receive the SIM card at an acute angle to a mating face and locking tabs at a second end remote from the first end to hold the SIM card in a parallel orientation relative to the mating face.

U.S. Pat. No. 5,320,552 assigned to Am phenol-Tackle Electronics GmbH describes a contact holder having a pull-out stop or cover adapted to retain the SIM in a readable position within a recess.

EP 0 743 717 assigned to the present Assignees discloses a two piece SIM card receiving portion, and GB 2 342 788 of L & K Precision Industry Company Limited describes a clasping connector for a SIM card.

The known prior art, of which that hereinbefore described is a representative list, although describing differing retainer portions, discloses the positioning of the SIM card retainer portion or holder within the body of the telephone. The retainer portion is required to secure the SIM card in contact with the electronic circuitry within the body of the telephone. In the known arrangements this is effected by a SIM card holder mounted on a printed circuit board (PCB) of the telephone electronic circuitry within the body of the telephone and adapted to retain the SIM card therein.

There is, therefore, a requirement for a mounting arrangement that enables an easy mounting of a SIM card within a mobile telephone without the need for additional components within the body of the telephone to effect securement of the card therein.

SUMMARY OF THE INVENTION

These needs and other are addressed by the present invention which is provided in a telephone handset having a front cover and a mateable rear cover. The mated front and rear cover define an inner area of the handset adapted to receive electronic circuitry for the operation of the telephone, and a portion of the rear cover is adapted to provide a housing for a SIM card. The SIM card housing is adapted such that a housed SIM card is in electronic communication with the electronic circuitry contained within the inner area of the telephone handset.

The rear portion additionally provides a housing for a battery. The battery housing typically occludes at least a portion of the SIM card housing such that it is necessary to remove the battery from its housing so as to effect access to the SIM card within its housing.

The rear cover comprises an inwardly facing portion, an outwardly facing portion and an edge portion provided between the inwardly facing portion and the outwardly facing portion, the edge portion extending about and defining the perimeter of the rear cover portion.

The rear cover is additionally provided with electronic contacts or terminals adapted to enable electronic communication between the SIM card and the electronic circuitry contained within the telephone. The electronic terminals of the rear cover project through the rear cover to the inwardly facing portion of the rear cover so as to provide an electronic contact surface of the rear cover adapted to make contact with the electronic circuitry of the telephone handset once the rear cover is mated with the front cover.

The edge portion of the rear cover portion is dimensioned such that, in use, when the rear cover is mated with the corresponding front cover of the telephone so as to form a telephone handset, the edge portions of both the rear and front cover portions of the telephone define the outer perimeter of the handset.

The housing for the SIM card is formed on the outwardly facing portion of the rear cover, and desirably formed from a recess provided in the outwardly facing portion of the rear cover.

The SIM card housing preferably comprises a base and side walls extending from and about the base defining a receiving portion of the housing. The receiving portion of the housing is substantially equivalent in area to the perimeter of the SIM card to be received therein.

The terminals for the SIM card are preferably located within the base of the SIM card housing.

The housing preferably further comprises a retention lug. The lug is formed on an upper surface of one of the side walls of the housing, the lug projecting from the side wall substantially parallel to the base of the housing. In use, when a SIM card is placed fully into the receiving portion of the housing it is retained therein by the interaction of one end of the SIM card with the lug. The lug comprises an inner surface and is desirably formed on the side wall of the housing at a distance from the base sufficient that when a SIM card is inserted fully into the housing, a portion of an upper surface of the SIM card abuts against the inner surface of the lug.

The housing preferably further comprises a catch member adapted to be moveable between an open position wherein a SIM card may be presented into or removed from the receiving portion of the housing, and a closed position wherein a SIM card positioned within the receiving portion is held therein.

The catch member is desirably provided on an opposing side of the housing to that of the lug such that an inserted SIM card is held at two opposing locations within the housing.

The catch member is desirably integrally formed with the rear cover, the catch member being resiliently biased towards the closed position. The catch member preferably extends from the base of the housing upwardly and inwardly so as to occlude a portion of the receiving portion, such that when a SIM card is fully inserted into the receiving portion, an upper surface of the catch member abuts against an upper surface of the SIM card, thereby retaining the SIM card within the housing.

Additional electronic terminals may be provided on the rear cover of the telephone handset, the additional electronic terminals adapted to provide electronic contact between a battery mounted on the rear cover and electronic circuitry contained within the telephone.

The electronic terminals provided on the rear cover preferably extend from the outwardly facing portion through the rear cover portion to the inwardly facing portion, the electronic terminals adapted such that when the rear cover is in a mated position with the front cover that the terminals are in contact with corresponding terminals on the electronic circuitry contained within the telephone handset so as to provide electronic contact between one or more devices mounted on the outwardly facing portion with electronic circuitry contained within the telephone. This electronic contact is desirably provided by the electronic terminals having outwardly facing contact members, which in use are in contact with the electronic devices mounted on the outwardly facing portion of the rear cover, and inwardly facing contacts. In use, when the rear cover is mated with the front cover, the inwardly facing contacts are brought into physical contact with corresponding contacts of the electronic circuitry, thereby providing the electronic contact between the devices mounted on the rear cover and the electronic circuitry within the handset. It will be appreciated that the removal of the rear cover from the telephone handset effects the removal of the electronic terminals from contact with the electronic circuitry contained within the telephone.

The electronic circuitry is preferably mounted to an internal face of the front cover of the telephone handset, the front cover is further adapted to retain a screen and keypad which are accessible from an external face of the front cover. The screen and keypad are utilized by a user, during operation of the telephone, to access the functional components of the electronic circuitry.

In a preferred embodiment a SIM card housing for a SIM card is provided within a rear cover of a telephone handset, the SIM card housing being dimensioned to receive a SIM card, the housing having a base and side walls which extend upwardly from the base and define a perimeter of a receiving portion of the housing, the receiving portion area being substantially equivalent to the area of the SIM card to be received therein.

In a preferred embodiment the present invention provides a mobile telephone handset having a front cover portion and a rear cover portion adapted to mate with the front cover portion, mated front and rear portions defining an inner area of the mobile phone adapted to envelop therein electronic circuitry for the operation of the mobile telephone and wherein the rear portion of the mobile telephone is provided with a SIM card retaining portion adapted to receive a SIM card, the retaining portion provided with electronic contacts adapted to enable electronic communication between a received SIM card and the electronic circuitry.

The invention also provides a housing for a telephone handset, the housing having a plurality of electronic contacts provided therein, the mounting of the electronic contacts within the housing providing a single interconnect assembly for the telephone handset.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following drawings, in which like reference numerals identify like elements in the Figures and in which:

DETAILED DESCRIPTION OF THE DRAWINGS

Figure 1:
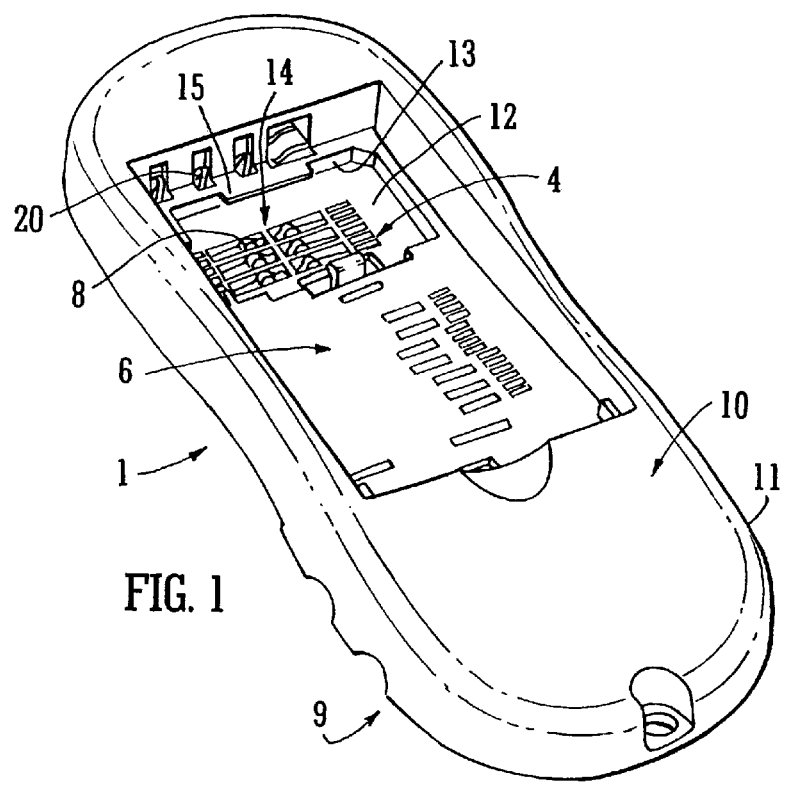
FIG. 1 is perspective view of a rear cover of a telephone handset according to the present invention, with SIM card and battery removed.

FIGS. 1 to 6 show a rear cover 1 for telephone handset 2 having a front cover 3 and a mateable rear cover 1 according to the present invention. The mated front and rear cover define an inner area of the handset adapted to receive electronic circuitry 27 for the operation of the telephone. A portion of the rear cover is adapted to provide a housing 4 for a SIM card 5, the housed SIM card being in electronic communication with the electronic circuitry contained within the inner area of the telephone handset.

The rear portion 1 additionally provides a housing 6 for a battery 7.

The rear cover 1 is additionally provided with electronic terminals 8 adapted to enable electronic communication between a retained SIM card 5 and the electronic circuitry 27 contained within the telephone.

Figure 6:
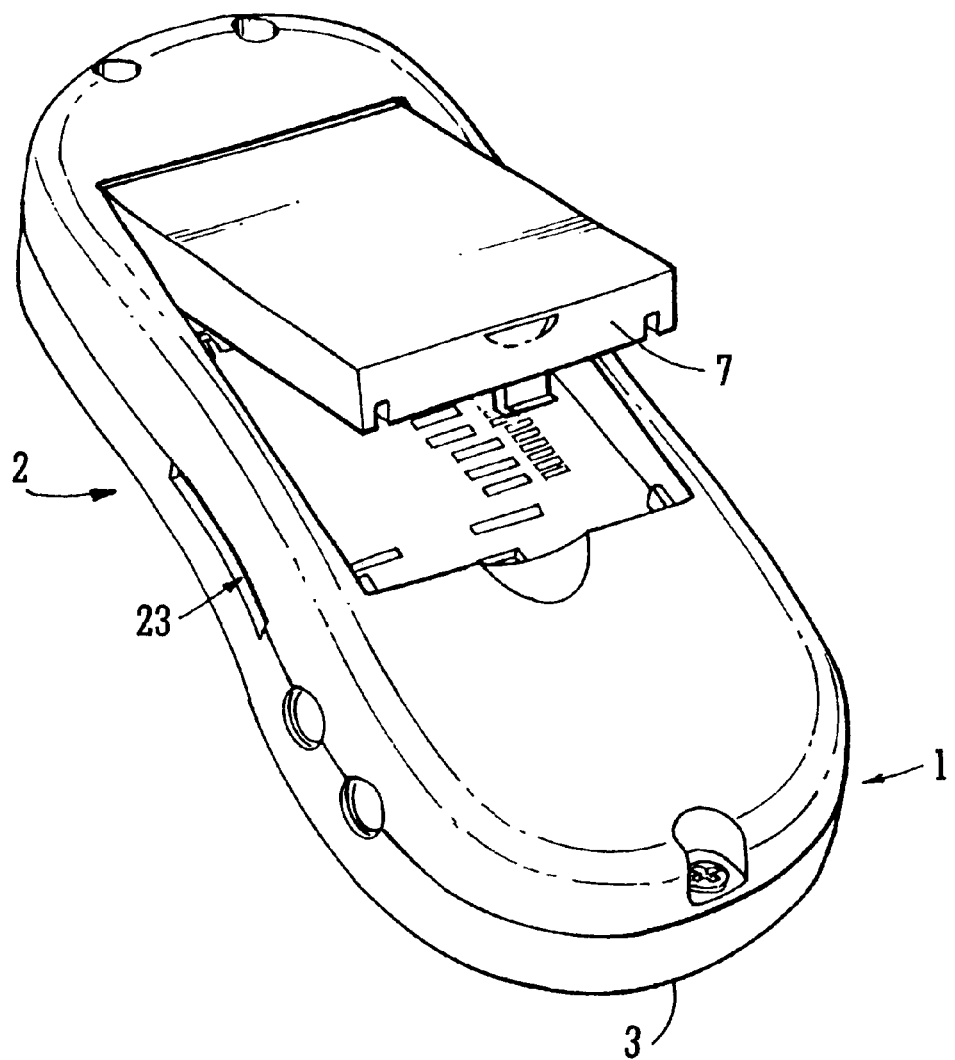
FIG. 6 is a perspective view from the rear of a telephone handset according to the present invention.

The rear cover 1 comprises an inwardly facing portion 9, an outwardly facing portion 10 and an edge portion 11 provided between the inwardly facing portion and the outwardly facing portion. The edge portion extends about and defines the perimeter of the rear cover portion 1. The edge portion of the rear cover portion is dimensioned such that, in use, when the rear cover is mated with the corresponding front cover of the telephone so as to form a telephone handset 2 (as shown in FIG. 6), the edge portions of both the rear and front cover portions of the telephone define the outer perimeter of the handset.

The housing 4 for the SIM card 5 is desirably formed on the outwardly facing portion 10 of the rear cover 1, and is desirably provided for under the battery housing 6 such that when inserting or removing a SIM card 5 from its housing 4, the battery 7 must first be removed from its housing 6. As is evident from FIGS. 1 and 6 the battery housing 6 is formed over the SIM card housing such that when a battery 7 is inserted into its housing 6, the battery 7 occludes the SIM card 5 contained within its housing 4. The SIM card is thereby not accessible from the outwardly facing portion 10 of the rear cover 1 until the battery is removed from its housing.

Both the SIM card housing 4 and the battery housing 6 are typically formed from recesses provided in the outwardly facing portion of the rear cover. The SIM card housing 4 comprises a base 12 and side walls 13 extending from and about the base 12, the side walls 13 defining a receiving portion 14 of the housing 4. The receiving portion 14 of the housing is preferably substantially equivalent in area to the surface area of the SIM card to be received therein.

Figure 4:
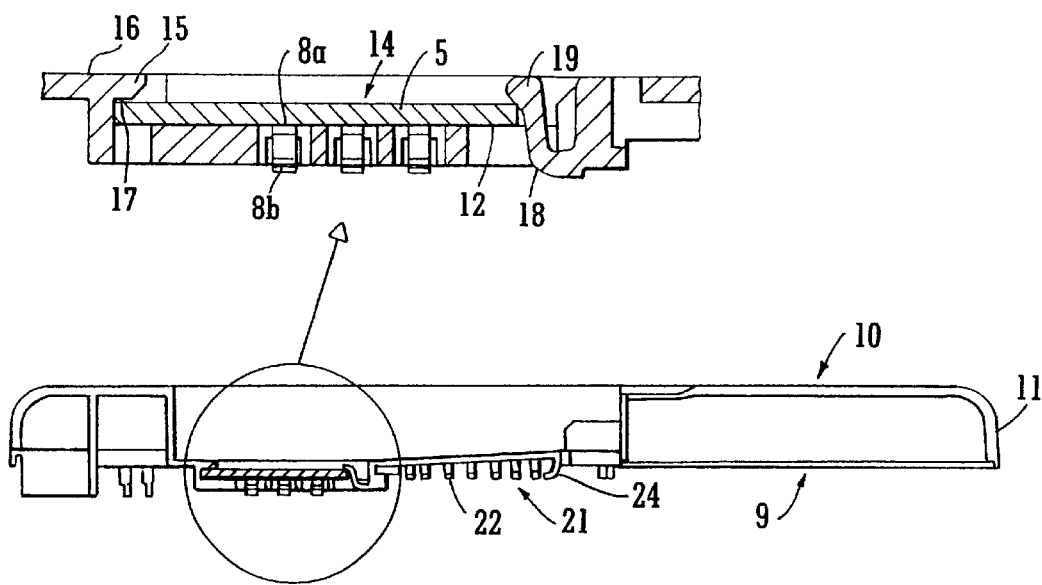
FIG. 4 is a section through the rear cover of FIG. 3 along the line IV—IV, showing a fully inserted SIM card, which is further detailed in an enlarged view.

The terminals 8 for the SIM card 5 are preferably located within the base 12 of the SIM card housing 4. As shown in FIG. 4, the terminals have outwardly facing contacts 8a and inwardly facing contacts 8b, the outwardly facing contacts 8a adapted to make contact with housed SIM card on the rear cover of the handset, and the inwardly facing contacts 8b to contact corresponding terminals provided on the electronic circuitry provided within the handset.

The housing 4 preferably further comprises a retention lug 15. The lug 15 is formed on an upper surface 16 of one of the side walls 13 of the housing 4. The lug projects from the side wall substantially parallel to the base of the housing. In use, as shown in FIG. 4, when a SIM card 5 is placed fully into the receiving portion 14 of the housing 4, it is retained therein by the interaction of one end of the SIM card with the lug.

The lug comprises an inner surface 17 and is desirably formed on the side wall of the housing at a distance from the base sufficient that when the SIM card 5 is inserted fully into the housing a portion of an upper surface of the SIM card abuts against the inner surface 17 of the lug 15.

The housing preferably further comprises a catch member 18 adapted to be moveable between an open position wherein a SIM card may be presented into or removed from the receiving portion of the housing, and a closed position wherein a SIM card positioned within the receiving portion is held therein. The catch member 18 is desirably provided on an opposing side of the housing to that of the lug 15 such that an inserted SIM card 5 is held at two opposing edges 5a, 5b within the housing.

The catch member 18 is desirably integrally formed with the rear cover 1, the catch member being resiliently biased towards the closed position, such that when a SIM card is positioned within the receiving portion of the housing, the catch member 18 must be actively moved to an open position to facilitate the removal of the SIM card from the receiving portion.

As shown in FIG. 4, the catch member 18 extends from the base 12 of the housing upwardly and inwardly so as to occlude a portion of the receiving portion 14, such that when a SIM card is fully inserted into the receiving portion, an upper surface 19 of the catch member abuts against an upper surface of the SIM card, thereby retaining the SIM card within the housing 4.

Figure 2:
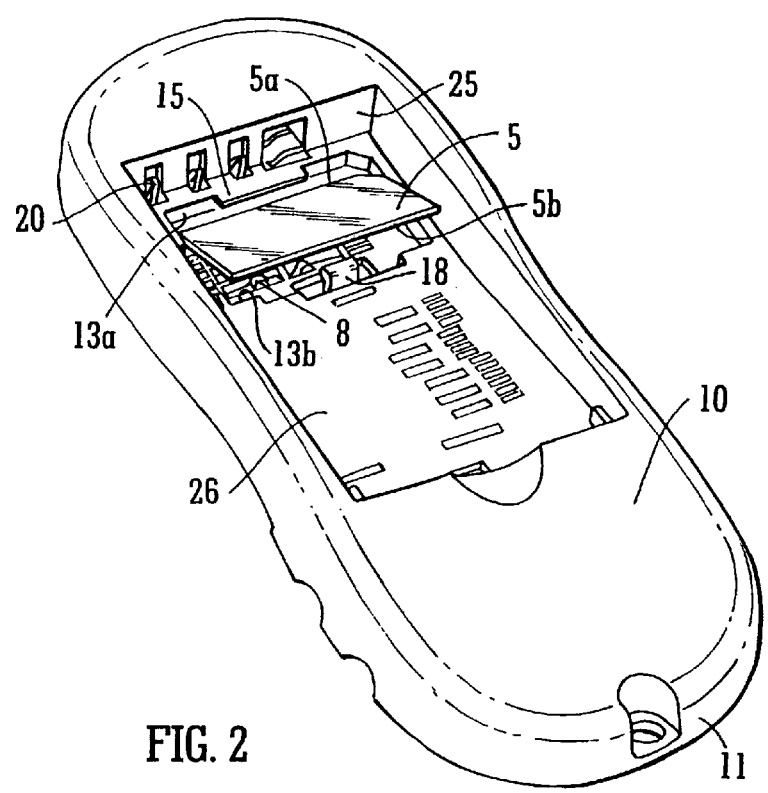
FIG. 2 is a perspective view of the rear cover of FIG. 1 with a SIM card partially inserted into its housing.
Figure 3:
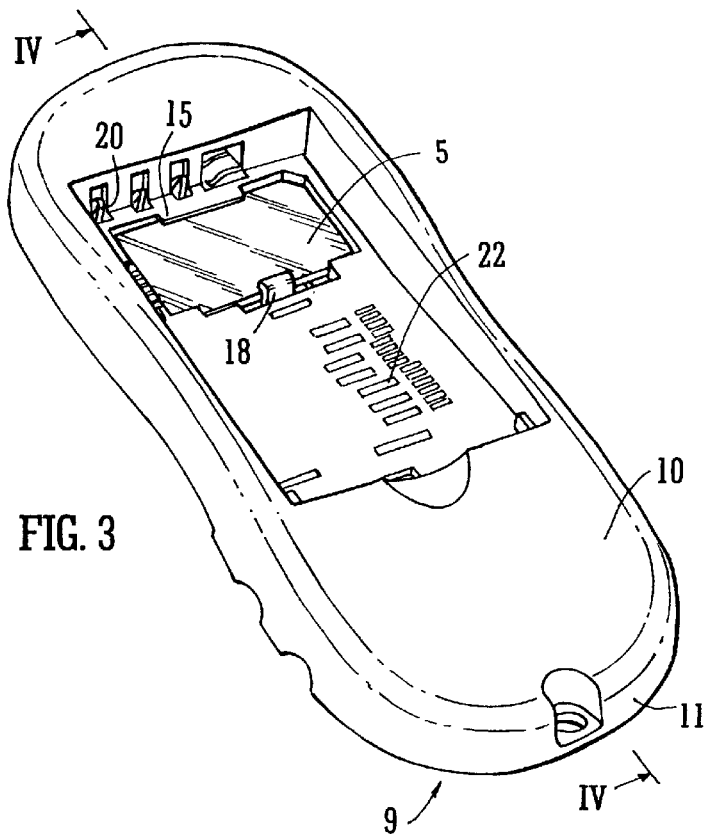
FIG. 3 is a perspective view of the rear cover of FIG. 1, with a SIM card fully inserted into its housing.

As shown in FIG. 2, the battery housing 6 also comprises side walls 25 and a base 26. The base is not co-planar with the outwardly facing portion 10, rather it tapers inwardly towards the SIM housing 4 and is dimensioned to receive a battery 7. When fully inserted into its housing the battery forms, in combination with the remaining portion of the outwardly facing portion, a flush outer cover for the rear cover. Battery connection electronic terminals 20 are provided within the side walls 25 of the battery housing. These additional electronic terminals 20 are adapted to provide electronic contact between the battery 7 mounted on the rear cover 1 and electronic circuitry contained 27 within the telephone.

Figure 5:
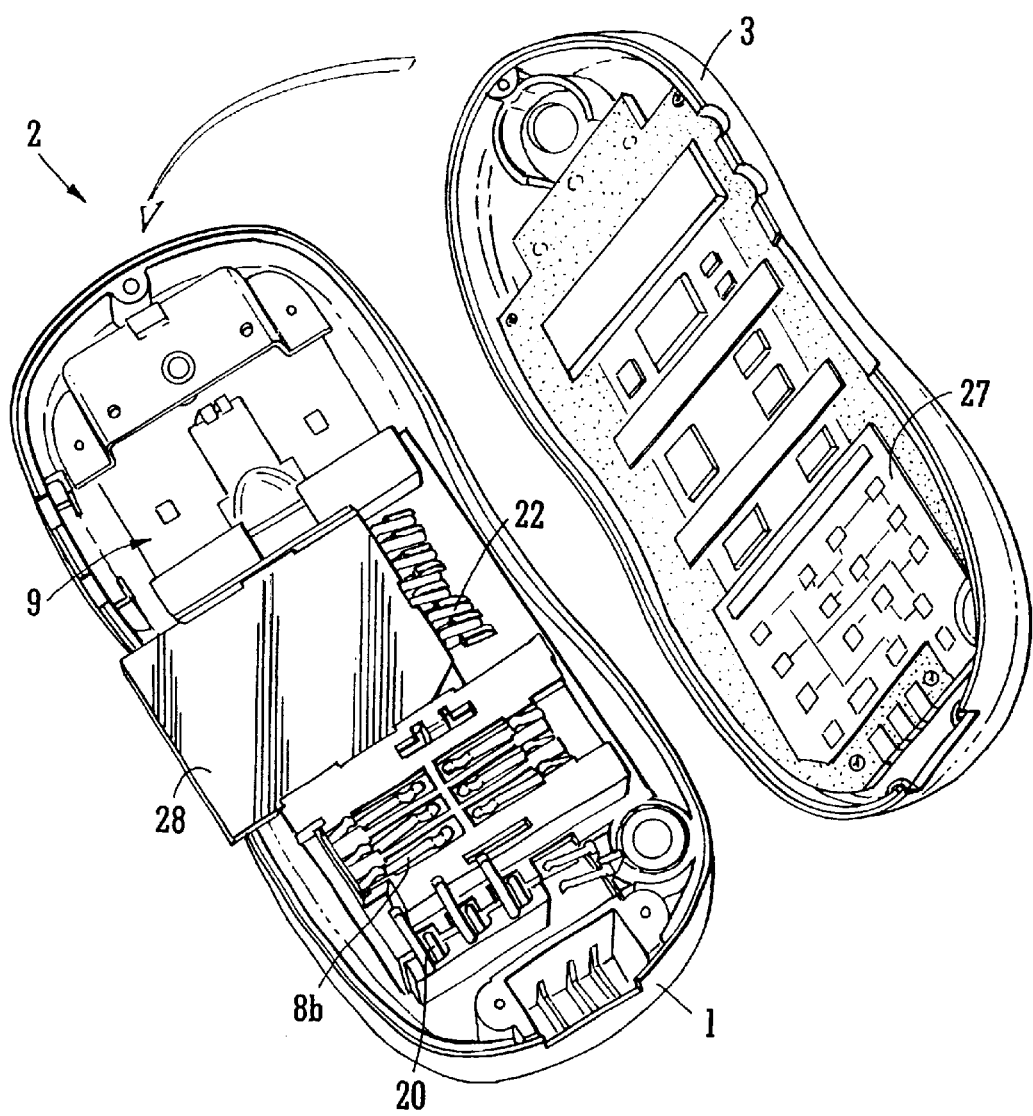
FIG. 5 is an exploded view showing a rear cover according to the present invention being brought into a mated position with a front cover of a handset.

The electronic terminals 8, 20 provided on the rear cover 1 preferably extend from the outwardly facing portion 10 through the rear cover 1 to the inwardly facing portion 9. The electronic terminals 8, 20 are adapted such that when the rear cover is in a mated position with the front cover that the terminals 8b, 20 are in contact with corresponding terminals on the electronic circuitry contained within the telephone. Electronic contact is thereby provided between the SIM card 5 and battery 7 mounted on the outwardly facing portion with electronic circuitry 27 contained within the telephone. As the terminals are integrally provided with the rear cover, any movement of the rear cover effects movement of these terminals. The presentation of the rear cover 1 to the front cover 3, as shown in FIG. 5, brings the terminals of the rear cover into contact with electronic circuitry 27, which is typically mounted to the front cover, thereby establishing an electronic contact between devices mounted on the rear cover and the electronic circuitry mounted to the front cover of the handset. It will be appreciated that similarly the removal of the rear cover from the telephone handset effects the removal of the electronic terminals from contact with the electronic circuitry contained within the telephone.

The varying stages of presentation of a SIM card to its housing are shown sequentially in FIGS. 1 to 4. To effect access to the SIM card housing 4 it is necessary to first remove the battery 7 from its housing 6 (FIG. 1). The SIM card 5 is then presented to its housing with a leading edge 5a thereof, angularly presented under the lug 15 (FIG. 2). Once the leading edge 5a abuts against the side wall 13a, it is possible to lower the trailing edge 5b into contact with the catch member 18. Due to the resilient nature of the catch member 18 this bringing into contact with the trailing edge 5b of the SIM card 5, effects a movement of the catch member away from the SIM card 5, so that the trailing edge 5b of the SIM card can pass the upper surface 19 of the catch member and into the receiving portion 14 of the housing. Once the SIM card 5 is fully inserted, the trailing edge 5b abuts against the side wall 13b (FIG. 3), and the catch member 18 moves back to its closed position. The upper surface 19 of the catch member abuts against and retains the SIM card 5 within the housing (FIG. 4).

The rear cover may also be adapted to provide a housing 21 for a memory or multi-media card connector 28 (FIG. 5). Card terminals 22, like the SIM terminals 8, are provided on rear cover 1. When the rear cover is mated with the front cover, an entry port 23 is provided by molding the edge portions of the front and rear covers to accommodate a card (FIG. 6). An internal guide member 24 is provided on the inwardly facing portion 9 of the rear cover 1 so as to facilitate a correct positioning of the card within the inner area of the telephone handset. The card terminals 22 also serve to provide a stop to the card, such that when the card abuts against the terminals 22, the card is fully inserted.

As is evident from the above description, the present invention provides a housing for a telephone handset, the housing having a plurality of electronic contacts provided therein, the provision of the electronic contacts within the housing providing a single interconnect assembly for the telephone handset. This integration of some of the electronic components necessary for the operation of the telephone onto the exterior housing of the handset facilitates the designer of the telephone to provide more compact handsets which provide complete functionality in a manner which reduces weight, volume and cost of the handset.

Although it is known within the art to provide a housing for the telephone battery within the rear cover portion of the telephone, a SIM card housing with electronic terminals suitable for providing electronic contact between a SIM card and electronic circuitry contained within the body of the handset has never hereintobefore been disposed in the rear cover portion of the telephone. It will be appreciated by those skilled in the art that although the housing of the present invention has been described with reference to a recess having a retention lug and a catch member that any other housing may also be found suitable.

Words such as "top", "above", "upper", "lower", "upwards", "downwards", "height", "up and down", "inwardly", "outwardly" and the like are used herein with reference to the positions of the device and/or the components thereof illustrated in the drawings and do not necessarily relate to the positions adapted when the device is in use. Such terms are used without limiting effect.

While described in detail here, many modifications and equivalents thereof will be clear to those persons of ordinary skill in the art and are intended to be covered hereby, the full measure of the spirit and scope of the invention being defined by the claims.

We claim:

1. In a telephone handset having a front cover and a mateable rear cover, the mated front and rear covers defining an inner area of the handset adapted to receive electronic circuitry for the operation of the telephone, the rear cover comprising:

a SIM housing for receiving a SIM card and electronic terminals adapted to make contact with the SIM card and the electronic circuitry contained within the telephone, wherein the rear cover comprises an inwardly facing portion, an outwardly facing portion and an edge portion provided between the inwardly facing portion and the outwardly facing portion, the edge portion defining the perimeter of the rear cover, wherein the SIM housing is formed on the outwardly facing portion of the rear cover and wherein the SIM housing comprises a base and side walls extending from the base defining a receiving portion of the SIM housing, the receiving portion of the SIM housing being substantially equivalent in area to the area defined by the perimeter of the SIM card to be received therein, wherein the SIM housing further comprises a retention lug, the lug being formed on an upper surface of one of the side walls of the SIM housing, the lug projecting from the side wall substantially parallel to the base of the SIM housing, and wherein when a SIM card is placed into the receiving portion of the SIM housing it is retained by the interengagement between one end of the SIM card and the lug, wherein the lug is formed on the side wall of the SIM housing at a distance from the base such that when a SIM card is inserted fully into the SIM housing, a portion of an upper surface of the SIM card abuts against an inner surface of the lug, and wherein the rear cover further comprises a catch member adapted to be moveable between an open position wherein a SIM card may be presented into or removed from the receiving portion of the SIM housing, and a closed position wherein a SIM card positioned within the receiving portion is held therein, wherein the catch member extends from the base of the SIM housing upwardly and inwardly so as to occlude a portion of the receiving portion, such that when a SIM card is inserted into the receiving portion, an upper surface of the catch member abuts against an upper surface of the SIM card, thereby retaining the SIM card within the SIM housing.

* * * * *